United States Patent
Aabye et al.

(10) Patent No.: US 11,727,397 B2
(45) Date of Patent: *Aug. 15, 2023

(54) SYSTEMS AND METHODS FOR DOMAIN RESTRICTION WITH REMOTE AUTHENTICATION

(71) Applicant: Visa International Service Association, San Francisco, CA (US)

(72) Inventors: Christian Aabye, Redwood City, CA (US); Christopher Jones, Greenbrae, CA (US)

(73) Assignee: Visa International Service Association, San Francisco, CA (US)

(*) Notice: Subject to any disclaimer, the term of this patent is extended or adjusted under 35 U.S.C. 154(b) by 239 days.

This patent is subject to a terminal disclaimer.

(21) Appl. No.: 17/337,252

(22) Filed: Jun. 2, 2021

(65) Prior Publication Data

US 2021/0287211 A1 Sep. 16, 2021

Related U.S. Application Data

(63) Continuation of application No. 16/358,558, filed on Mar. 19, 2019, now Pat. No. 11,055,705, which is a
(Continued)

(51) Int. Cl.
*G06Q 20/38* (2012.01)
*G06Q 20/12* (2012.01)
(Continued)

(52) U.S. Cl.
CPC ....... *G06Q 20/38215* (2013.01); *G06Q 20/12* (2013.01); *G06Q 20/385* (2013.01);
(Continued)

(58) Field of Classification Search
CPC ............. G06Q 20/38215; G06Q 20/12; G06Q 20/385; G06Q 20/40; G06Q 2220/00;
(Continued)

(56) References Cited

U.S. PATENT DOCUMENTS 9,514,458 B2 * 12/2016 Rutherford .......... G06Q 20/341
10,282,726 B2     5/2019 Aabye et al.
(Continued)

FOREIGN PATENT DOCUMENTS

WO     2017151509 A1    9/2017

OTHER PUBLICATIONS

EMVCo ("EMV Payment Tokenisation Specification Technical Framework" (Version 1.0, Mar. 2014, 84 pages, EMVCo)) (Year: 2014).*
(Continued)

*Primary Examiner* — James D Nigh
(74) *Attorney, Agent, or Firm* — Kilpatrick Townsend & Stockton LLP

(57) ABSTRACT

A process for combining domain restriction and remote authentication may include receiving a token from a plug-in application to conduct a transaction associated with a user of a communicating device. The process may include sending an authentication request to a remote access control sever to authenticate the user, and receiving, from the remote access control server, an authentication tracking value that the remote access control server used in generation of an authentication cryptogram. The process may also include generating, using the authentication tracking value, a domain restriction cryptogram that is used for domain restriction of the token, and sending, to the plug-in application, the domain restriction cryptogram.

20 Claims, 6 Drawing Sheets

Related U.S. Application Data continuation of application No. 15/060,212, filed on Mar. 3, 2016, now Pat. No. 10,282,726.

(51) Int. Cl.
  *G06Q 20/40* (2012.01)
  *H04L 9/32* (2006.01)
  *H04L 9/40* (2022.01)
  *H04W 12/12* (2021.01)

(52) U.S. Cl.
  CPC ........... *G06Q 20/40* (2013.01); *H04L 9/3226* (2013.01); *H04L 9/3234* (2013.01); *H04L 63/06* (2013.01); *H04L 63/08* (2013.01); *H04W 12/12* (2013.01); *G06Q 2220/00* (2013.01); *H04L 63/0428* (2013.01); *H04L 63/10* (2013.01); *H04L 2209/56* (2013.01)

(58) Field of Classification Search
  CPC ..... H04L 9/3226; H04L 9/3234; H04L 63/06; H04L 63/08; H04L 63/0428; H04L 63/10; H04L 2209/56; H04W 12/12
  USPC .......................................................... 705/76
  See application file for complete search history.

(56) References Cited

U.S. PATENT DOCUMENTS

| | | | | |
|---|---|---|---|---|
| 2003/0120554 A1* | 6/2003 | Hogan | .................... | G06Q 30/06 705/64 |
| 2008/0154770 A1* | 6/2008 | Rutherford | ........... | G07F 7/1008 705/44 |
| 2009/0024851 A1* | 1/2009 | Andrade | ............... | H04L 9/3234 713/176 |
| 2011/0126023 A1* | 5/2011 | Wang | ...................... | G06F 21/78 726/19 |
| 2011/0208658 A1 | 8/2011 | Makhotin | | |
| 2012/0116976 A1 | 5/2012 | Hammad et al. | | |
| 2015/0032626 A1 | 1/2015 | Dill et al. | | |
| 2015/0127547 A1 | 5/2015 | Powell et al. | | |
| 2015/0161608 A1* | 6/2015 | Gilbert | ............... | G06Q 20/4014 705/44 |
| 2015/0319158 A1* | 11/2015 | Kumnick | ................ | H04L 67/02 726/9 |
| 2016/0239833 A1* | 8/2016 | Venugopalan | ... | G06Q 20/38215 |
| 2016/0267467 A1* | 9/2016 | Rutherford | ........... | H04L 9/3228 |
| 2017/0255932 A1 | 9/2017 | Aabye et al. | | |

OTHER PUBLICATIONS

"EMV Payment Tokenisation Specification Technical Framework", Version 1.0, EMVCo, Available online at: https://media.scmagazine.com/documents/95/emvco_payment_tokenisation_spe_23619.pdf, Mar. 31, 2014, 84 pages.

U.S. Appl. No. 15/060,212, "Final Office Action", dated Jul. 27, 2018, 25 pages.

U.S. Appl. No. 15/060,212, "Non-Final Office Action", dated Mar. 28, 2018, 26 pages.

U.S. Appl. No. 15/060,212, "Notice of Allowance", dated Dec. 19, 2018, 12 pages.

U.S. Appl. No. 16/358,558, "Notice of Allowance", dated Mar. 3, 2021, 13 pages.

PCT/US2017/019704, "International Preliminary Report on Patentability", dated Sep. 13, 2018, 8 pages.

PCT/US2017/019704, "International Search Report and Written Opinion", dated May 26, 2017, 10 pages.

* cited by examiner

SYSTEMS AND METHODS FOR DOMAIN RESTRICTION WITH REMOTE AUTHENTICATION

CROSS-REFERENCES TO RELATED APPLICATIONS

The present application is a continuation of U.S. application Ser. No. 16/358,558, filed on Mar. 19, 2019, which is a continuation of U.S. application Ser. No. 15/060,212 filed Mar. 3, 2016, now U.S. Pat. No. 10,282,726, the entire contents of all of which are herein incorporated by reference for all purposes.

BACKGROUND

With Internet access being widely available, e-commerce has become a prevalent way of conducting transactions. However, ensuring that a consumer is an authorized user of an account when conducting a card-not-present transaction over the Internet can be problematic. Unlike card-present transactions in which a merchant can verify the identity of the consumer in person by requesting proper identification or by verifying a signature, it is difficult to verify whether a consumer is authorized to conduct the transaction over a computer network without the face-to-face interaction. As such, additional security measures can be taken to avoid unauthorized transactions from being conducted over the Internet.

Embodiments of the present invention address these and other problems individually and collectively.

BRIEF SUMMARY

Embodiments of the present invention provide systems and methods for combining domain restriction with remote authentication to prevent unauthorized transactions from being conducted over a computer network such as the Internet. An online transaction can be conducted with a token instead of a real account identifier. The token may have domain restriction to limit how the token can be used. During processing of a transaction, remote authentication of the user and the account credentials submitted over a computer network can be performed to validate that the user is authorized to conduct the transaction. The remote authentication process may generate an authentication cryptogram based on an authentication tracking value. The authentication tracking value can also be used to generate a domain restriction cryptogram, such that the domain restriction imposed on the token being used in transaction can be linked to the remote authentication processing. In this manner, domain restriction and remote authentication for a transaction can be combined to prevent unauthorized transactions from being conducted over a computer network such as the Internet.

According to some embodiments, a process for combining domain restriction and remote authentication for a transaction may include receiving a token from a plug-in application to conduct a transaction associated with a user of a communicating device. The process may include sending an authentication request to a remote access control sever to authenticate the user, and receiving, from the remote access control server, an authentication tracking value that the remote access control server used in generation of an authentication cryptogram. The process may also include generating, using the authentication tracking value, a domain restriction cryptogram that is used for domain restriction of the token, and sending, to the plug-in application, the domain restriction cryptogram. The transaction can then be authorized by verifying both the authentication cryptogram and the domain restriction cryptogram.

In some embodiments, the process for combining domain restriction and remote authentication for a transaction can be performed by a computing system including at least one processor and at least one memory coupled to the at least one processor. The at least one memory may store instructions, which when executed by the at least one processor can cause the at least one processor to implement the process for combining domain restriction and remote authentication for a transaction.

DETAILED DESCRIPTION

Figure 1:
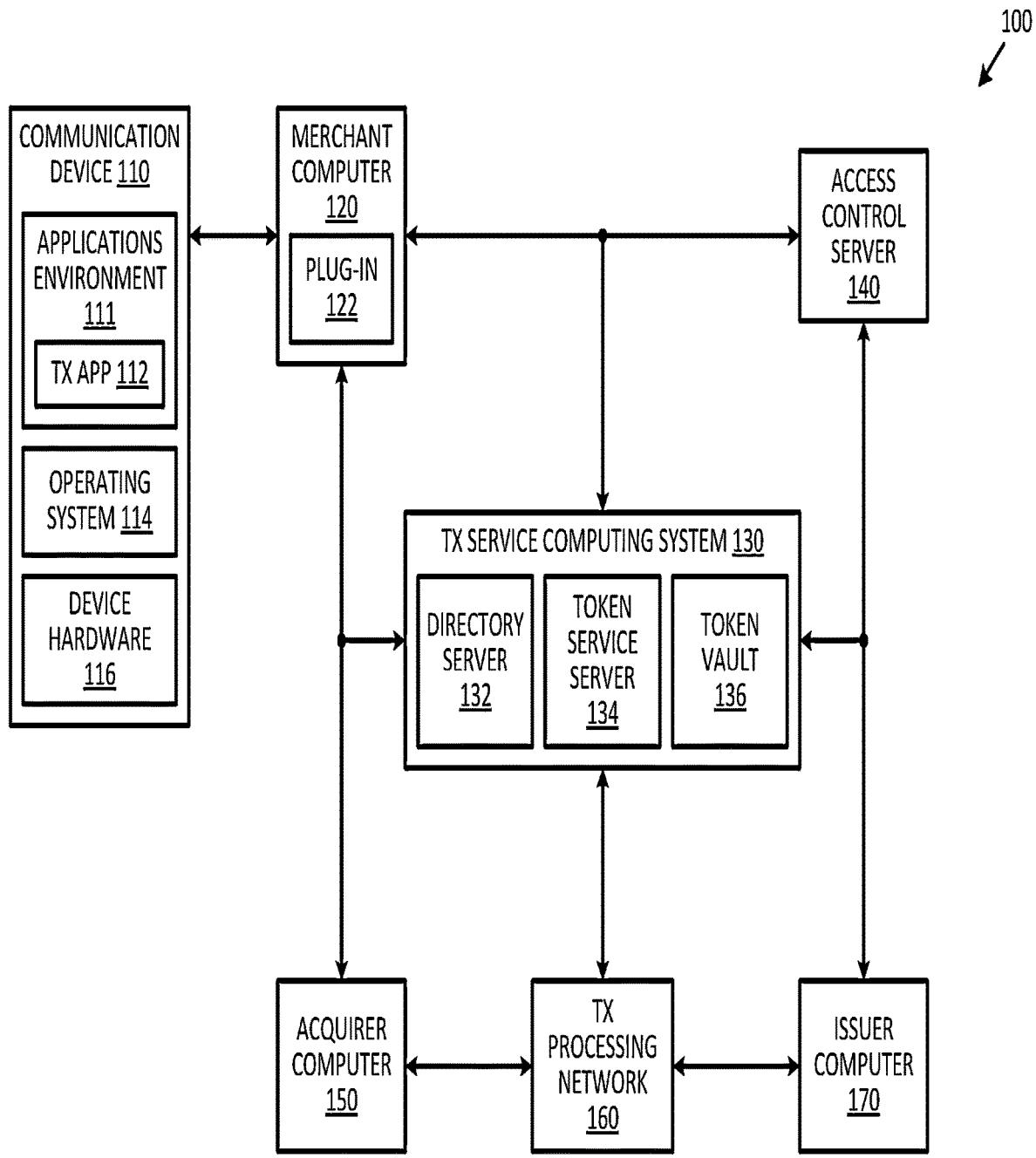
FIG. 1 illustrates a block diagram of an example of a system for combining domain restriction with remote authentication, according to some embodiments.

Embodiments of the present invention are directed to systems and methods for combining domain restriction controls with remote authentication to prevent unauthorized transactions from being conducted over a computer network such as the Internet.

One technique to reduce the likelihood of unauthorized transactions from being conducted is to use a remote authentication system to authenticate a user's account credentials before submitting the transaction to an issuer of the account for authorization. For example, when a user submits account credentials to conduct a transaction on a merchant website, a plug-in application can forward the account credentials to a remote access control server to authenticate the user and the account credentials. The remote access control server may verify that the account credentials are valid before the transaction is submitted to an issuer for authorization. An authentication cryptogram can be generated by the remote access control server based on the authentication results, and the authentication cryptogram can be verified for example, by the issuer, before approving the transaction.

Another technique to reduce the likelihood of unauthorized transactions from being conducted over a computer network such as the Internet is to apply domain restrictions to the account credentials to restrict the manner in which the account credentials can be used. For example, different tokens with different domain restriction can be issued for the same underlying account, and a token can be restricted for use with a particular presentment mode (e.g., contactless, e-commerce presentment mode, etc.), or be restricted for use at a particular merchant. The domain restriction controls may verify a domain restriction cryptogram to ensure that the token is being used within its domain before approving the transaction.

According to some embodiments of the present invention, a tokenized transaction (e.g., a transaction conducted using a token) can be subject to both remote authentication and domain restriction controls to ensure the tokenized transaction is being conducted by an authorized user within the token's domain. An authentication tracking value that is generated during the remote authentication process can be used in the generation of both the authentication cryptogram and the domain restriction cryptogram. In this manner, the domain restriction controls can be linked to the remote authentication processing for a particular transaction via the common authentication tracking value. Both the authentication cryptogram and the domain restriction cryptogram can be verified before a transaction is approved to increase the confidence that a transaction is being conducted by an authorized user.

Prior to discussing the details of some embodiments of the present invention, description of some terms may be helpful in understanding the various embodiments.

A "communication device" may be a device that includes one or more electronic components (e.g., an integrated chip) that can communicate with another device. For example, a communication device can be a computing device that includes at least one processor coupled to a memory that stores instructions or code for execution by the processor. A "portable communication device" may be a communication device that can be transported and operated by a user, and may include one or more electronic components (e.g., an integrated chip). A portable communication device may provide remote communication capabilities to a network. The portable communication device can be configured to transmit and receive data or communications to and from other devices. A portable communication device may be in the form of a mobile device such as a mobile phone (e.g., smart phone, cellular phone, etc.), tablets, portable media player, personal digital assistant devices (PDAs), wearable device (e.g., watch, health monitoring device such as a fitness tracker, etc.), electronic reader device, etc., or in the form of a card (e.g., smart card) or a fob, etc. Examples of portable communication devices may also include portable computing devices (e.g., laptops, netbooks, ultrabooks, etc.). A portable communication device may also be in the form of a vehicle (e.g., an automobile), or be integrated as part of a vehicle (e.g., an infosystem of a vehicle).

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers.

An "access device" may be any suitable device for communicating with a merchant computer or transaction processing network, and for interacting with a transaction device (e.g., a payment device), a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

An "authorization request message" may be an electronic message that is sent to request authorization for a transaction. The authorization request message can be sent to a transaction processing network and/or an issuer of a transaction card (e.g., a payment card). An authorization request message according to some embodiments may comply with ISO 8583, which is a standard for systems that exchange electronic transaction information associated with a transaction made by a user using a transaction device or transaction account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a transaction processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing network) to the merchant computer that indicates approval of the transaction. The code may serve as proof of authorization. As noted above, in some embodiments, a transaction processing network may generate or forward the authorization response message to the merchant.

A "token" may refer to a substitute identifier for some information. For example, a transaction token may include an identifier for a transaction account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "real account identifier" may refer to an original account identifier associated with an account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "transaction processing network" may include a network that can process and route transaction request messages. An exemplary transaction processing network may include data processing subsystems, networks, and operations used to support and deliver authorization services, exception file services, transaction scoring services, and clearing and settlement services. An exemplary transaction processing network may include VisaNet™. Transaction processing networks such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

"Tokenization" may refer to a process by which data is replaced with substitute data. For example, an account identifier (e.g., a primary account number (PAN)) may be tokenized by replacing the account identifier with a substitute number (e.g., a token) that is associated with the account identifier. Further, tokenization may be applied to other information which may be replaced with a substitute value. Tokenization may be used to enhance transaction efficiency, improve transaction security, increase service transparency, or to provide a method for third-party enablement.

A "token service provider" may refer to an entity including one or more server computers in a token service system that generates, processes, and maintains tokens. The token service provider may include or be in communication with a token vault where the generated tokens are stored. Specifically, the token vault may maintain one-to-one mapping between a token and the data (e.g., a real account identifier) represented by the token. A token service provider may provide reports or data output to reporting tools regarding approved, pending, or declined token requests, including any assigned token requestor identifiers (IDs). The token service provider may provide data output related to token-based transactions to reporting tools and applications and present the token and/or the data substituted by the token (e.g., real account identifiers) as appropriate in the reporting output.

A "token vault" may refer to a repository that maintains token-to-data mappings. For example, a token vault may maintain token-to-PAN mappings. According to various embodiments, the token vault may also maintain other attributes of the token requestor that may be determined at the time of registration, and that may be used by the token service provider to apply domain restrictions or other controls during transaction processing. The token vault may be a part of the token service system, and may be provided as part of a token service provider system. Alternatively, the token vault may be a remote repository accessible by the token service provider. Token vaults, due to the sensitive nature of the data mappings that are stored and managed in them, may be protected by strong underlying physical and logical security.

A "presentment mode" may indicate the method in which account credentials (e.g., a token) is submitted for a transaction. Examples of presentment modes may include machine readable codes (e.g., quick response code (QRC), barcode, etc.), mobile contactless modes (e.g., near-field communication (NFC) communication), e-commerce remote modes, e-commerce proximity modes, and any other suitable modes in which to submit account credentials such as a token. By way of example, a machine-readable code encoding token information can be generated by a wallet provider, mobile application, or other application on a communication device, and be displayed on a user interface of the communication device. The machine readable code can be scanned by an access device through which the token is passed to the merchant. A mobile contactless mode may include passing token information through NFC in a contactless message. An e-commerce remote mode may include submitting token information by a consumer or a wallet provider through an online transaction or as an e-commerce transaction using a merchant application or other application such as a web browser. An e-commerce proximity mode may include submitting token information by a consumer from a wallet application on a mobile device at a merchant location.

A "token requestor" may refer to an entity that requests a token. The token requestor may initiate a request that a real account identifier (e.g., a PAN) be tokenized by submitting a token request message to the token service provider. According to various embodiments, a token requestor may no longer need to store the real account identifier associated with a token once the requestor has received a token that substitutes for the real account identifier. The requestor may be an application, a device, a process, or a system that is configured to perform actions associated with tokens. A token requestor can request registration with a network token system, request token generation, token activation, token de-activation, token exchange, token lifecycle management related processes, and/or any other token related processes. A requestor may interface with a network token system through any suitable communication networks and/or protocols (e.g., using HTTPS, SOAP and/or an XML interface among others. Examples of token requestors may include communication devices (e.g., mobile phones and computers) operated by users, card-on-file merchants, acquirers, acquirer processors, and payment gateways acting on behalf of merchants, payment enablers (e.g., original equipment manufacturers, mobile network operators, etc.), digital wallet providers, issuers, third party wallet providers, and/or transaction processing networks. In some embodiments, a token requestor can request tokens for particular domains and/or channels. A token requestor may be registered and identified uniquely by the token service provider within the tokenization ecosystem. During token requestor registration, the token service provider may formally process the token requestor's application to participate in the token service system. The token service provider may collect information pertaining to the nature of the requestor and the relevant use of tokens to validate and formally approve the token requestor and establish appropriate domain restriction controls. Successfully registered token requestors may be assigned a token requestor identifier (ID) that may also be entered and maintained within the token vault. Token requestors may be revoked or be assigned new token requestor ID. This information may be subject to reporting and audit by the token service provider.

A "token domain" may indicate an area and/or circumstance in which a token can be used. Examples of token domains may include payment channels (e.g., e-commerce, physical point of sale, etc.), POS entry modes (e.g., contactless, magnetic stripe, etc.), presentment modes, and merchants where the token can be used. A set of parameters (i.e. token domain restriction controls) can be established as part of token issuance by the token service provider to allow enforcing appropriate usage of the token in transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a domain restriction cryptogram that is unique to a given transaction. In some embodiments, a token domain can be associated with a token requestor. For example, a token requestor may request tokens for a certain domain, and both the token requestor and domain may be identified by a certain token requestor ID.

A "token requestor identifier" may refer to any characters, numerals, or other identifiers associated with an entity associated with a network token system. In some embodiments, a unique token requestor ID may be assigned for each domain for a token request associated with the same token requestor. For example, a token requestor ID can identify a pairing of a token requestor (e.g., a mobile device, a mobile wallet provider, etc.) with a token domain (e.g., e-commerce, contactless, etc.). A token requestor ID may include any format or type of information. For example, a token requestor ID may include an alphanumerical value such as a ten digit or an eleven digit letter and/or number (e.g., 4678012345). In some embodiments, a token requestor ID may include a code for a token service provider (e.g., first 3 digits) such as the network token system and the remaining digits may be assigned by the token service provider for each requesting entity (e.g., mobile wallet provider) and the token domain (e.g., contactless, e-commerce, etc.).

"Token exchange" or "de-tokenization" may refer to a process of restoring the data that was substituted during tokenization. For example, a token exchange may include replacing a token with a corresponding real account identifier (e.g., a PAN) that was associated with the token during tokenization of the real account identifier. Thus, the de-tokenization may refer to the process of redeeming a token for the associated PAN based on a token-to-PAN mapping stored, for example, in a token vault. The ability to retrieve the substituted data (e.g., real account identifier such as a PAN) in exchange for the token may be restricted to specifically authorized entities, individuals, applications, or systems. Further, de-tokenization or token exchange may be applied to other types of information. In some embodiments, token exchange may be achieved via a transactional message, such as an ISO message, an application programming interface (API), or another type of web interface (e.g., web request).

A "merchant computer" may refer to one or more computers or servers used by a merchant to conduct transactions. For example, the merchant computer may be used to provide an online storefront for consumers to shop and also to conduct online transactions with consumers once the consumers have decided to purchase goods from the merchant. The merchant computer may include or may be in communication with an access device. In some embodiments, a merchant computer can be implemented as a web server.

A "merchant plug-in application" may refer to a proxy provided between the merchant computer and other computer servers in a transaction system. For example, the merchant plug-in application (MPI) may be a component that performs various authentication functions on behalf of the merchant. The MPI may be embodied by suitable hardware and/or software that are accessible to a merchant. For example, the MPI may be software running on the merchant server, or it may be a component run on a different server accessible by the merchant. The MPI may be able to perform functions such as determining whether authentication is available for an account, validating a digital signature in an authentication message, tokenization of account data, and other functions.

An "access control server" may refer to a server computer that provides authentication services to authenticate a consumer conducting an online transaction. An access control server may perform the requested authentication services for issuers or other entities, and provide digitally signed responses to entities requesting authentication. An access control server may be shared or used by multiple entities. An entity may also have multiple access control servers, each associated with a different subset of the consumers.

A "directory server" may refer to a server computer that can be used to route messages in a transaction system. The messages routed by the directory server may contain enrollment and authentication information between a merchant plug-in (MPI) and an issuer access control server. The directory server can also determine whether an account can utilize the authentication services. In some embodiments, the directory server can be operated by a transaction service provider. According to various embodiments, the directory server may also have the ability to tokenize account data or may de-tokenize tokens.

An "authentication request message" may be an electronic message that is transmitted to an authentication server to request authentication of a consumer. The data sent in the authentication request message may include the consumer's communication device data (e.g., device identifier, operating system data, browser data, mobile application data, geolocation data), user data (e.g., user name, user address data, user email address, user phone number), and transaction data (e.g., shopping cart data, user device data, payment account number, token), and/or other comparable data. In some embodiments, while some elements in the authentication request message are tokenized, the other elements may be in plain text (e.g. not tokenized).

An "authentication response message" may be an electronic message reply to an authentication request message. An authentication response message can be generated by an authentication computer such as an issuer access control server. The authentication response message may include an authentication value, which may be a code or cryptogram that an account issuer returns in response to an authentication request message in an electronic message (either directly or through a directory server) sent to the merchant computer or merchant plug-in (MPI) indicating whether the consumer is the rightful owner or assignee of the account identified in the authentication request message. The authentication value may serve as proof of authentication. Alternatively, the authentication response message can include data indicating that the authentication process failed. In some embodiments, the authentication response message may include an error code identifying the reason for failure of the authentication process.

Details of some embodiments of the present invention will now be described.

FIG. 1 illustrates a block diagram of a system 100 for combining token domain restrictions with remote authentication during processing of online transactions to prevent unauthorized transactions from being conducted over a computer network such as the Internet, according to some embodiments. System 100 includes a communication device 110, a merchant computer 120, a transaction service computing system 130, an access control server (ACS) 140, an acquirer computer 150, a transaction processing network 160, and an issuer computer 170. It should be understood that for simplicity of illustration, a certain number of components are shown in FIG. 1. However, some embodiments may include more than one of each component, and some embodiments may include fewer than or greater than the components specially shown in FIG. 1.

Communication device 110 can be operated by a user/consumer to conduct an online transaction via a computer network such as the Internet. Communication device 110 may include device hardware 116, an operating system (OS) 114, and applications environment 111. Device hardware 116 may include one or more processors coupled to one or more memories that store computer readable code executable by the one or more processors. Device hardware 116 may also include a communication subsystem with one or more communication interfaces (e.g., wireless transceivers) to allow communication device 110 to communicate or otherwise present information to another device, for example, over an external computer network. Examples of communication interfaces can include wired or wireless interfaces to support WiFi, near-field communications (NFC), Bluetooth, Bluetooth Low Energy (BLE), Ethernet, or other suitable communication protocols, etc. In some embodiments, device hardware may also include an optical interface such as a display to present information such as quick response (QR) codes, bar codes, etc.

Applications environment 111 of communication device 110 may include a transaction application 112 such as a merchant application provided by a merchant, or a browser application that can be used to access a merchant's website. In some embodiments, transaction application 112 can be an application from which a user can conduct online e-commerce or point of sale transactions with a particular merchant. In some embodiments, transaction application 112 can be a wallet application that supports multiple merchants. Transaction application 112 can be configured to send transaction data as part of a transaction. The transaction data may include communication device data, user identifying data, geolocation data, transaction amount, account credentials (e.g. account identifier, token, etc.), merchant data, or other comparable data. In some embodiments, transaction application 112 may provide the transaction data upon request from another entity, such as a merchant computer 120. For example, the transaction data may be obtained via a shopping cart of a merchant's website. In some embodiments, transaction application 112 can be configured to send the transaction data automatically as part of an online check out process initiated by the user of communication device 110.

Merchant computer 120 may include any suitable computational apparatus operated by a merchant. Examples of a merchant computer may include an access device and/or an online merchant computer. In some embodiments, merchant computer 120 may include a web server computer that hosts one or more websites associated with the merchant. Merchant computer 120 can be configured to send and receive data as part of a transaction verification and authentication process for an online transaction conducted between a consumer and the merchant. Merchant computer 120 may also be configured to generate of facilitate generation of authentication request messages, and route the authentication request messages, for example, to an issuer access control server 218 for additional transaction processing.

In some embodiments, merchant computer 120 may include a merchant plug-in application (MPI) 122, or may have access to a MPI implemented in a separate computing device. MPI may act as a proxy between merchant computer 120 and access control server 140 or other components within system 100. MPI 122 can be in communication with transaction service computing system 130 implementing tokenization services. When MPI 122 determines that the data received from communication device 110 or the authentication request message generated by merchant computer 120 includes a token, MPI 122 may identify the token service provider and interact with the identified token service provider to de-tokenize the token (e.g., to retrieve an account identifier such as a PAN corresponding to the token). In some embodiments, if remote authentication services are available for the account associated with the token (e.g., if the account has been enrolled for such services), MPI 122 may communicate with the access control server 140 by sending an authentication request message to the access control server 140 via transaction service computing system 130.

Transaction service computing system 130 may include one or more computing devices (e.g., one or more computers and/or servers) to implement tokenization services. The one or more computing devices of transaction service computing system 130 can be operated by the same entity (e.g., a token service provider, transaction processor, etc.) or a combination of different entities (e.g., a combination of any of issuer, token service provider, transaction processor, etc.). Transaction service computing system 130 may include a directory server 132, a token service server 134, and a token vault 136. In some embodiments, the functionalities or a subset of the functionalities performed by directory server 132, token service server 134, and token vault 136 can be integrated into one computing device. It should also be understood that in some embodiments, the functionalities performed by directory server 132, token service server 134, and/or token vault 136 can be split up differently that what is specifically described herein. For example, in some embodiments, some functionalities performed by directory server 132 can be performed by token service server 134 instead, or vice versa.

Directory server 132 can be a server computer configured to route authentication messages from MPI 122 to the access control server 140, as well as messages back from access control server 218 to MPI 122. In some embodiments, directory server 132 may also interact with token service server 134 to perform tokenization and de-tokenization services during processing of a transaction. For example, if a token is used to conduct a transaction, directory server 132 may identify the token service provider associated with the token, and communicate with token service server 134 operated by the identified token service provider to retrieve an account identifier (e.g., PAN) associated with the token to determine if remote authentication services provided by access control server 140 is available for the account.

Token service server 134 can be a server computer configured to issue a token as a substitute for a real account identifier (e.g., PAN). When a token requestor requests a token from token service server 134, domain restriction controls can be applied to the token to restrict its use to a particular type of presentment mode, or to a particular merchant. Token service server 134 may assign a token requestor ID that can be used to identify the token requestor and the domain restrictions imposed on the token. During processing of a transaction, token service server 134 can verify that a token is being used within its domain. Token service server 134 may also perform de-tokenization services by retrieving a real account identifier associated with a token from token vault 136.

Token vault 136 can be used to store mappings between an issued token, the token requestor who requested the token, the domain restrictions of a token, and the real account identifier being substituted by the token. In some embodiments, the token requestor and the domain restrictions can be identifier by a token requestor ID. Thus, token vault 136 may store a mapping between a token, its corresponding token requestor ID, and the corresponding account identifier such as a PAN. During transaction processing, token vault 136 can be queried by token service server 134 to retrieve a real account identifier and the token requestor ID associated with the token being used in the transaction.

Access control server 140 can be a remote server computer configured to conduct remote authentication processing, for example, in response to an authentication request from a merchant. Access control server 140 can be associated with an issuer, which can be a bank that issues and maintains accounts for consumers. Access control server 140 may validate (or authenticate) account credentials during processing of a transaction. For example, access control server 140 may verify the account credentials are valid. In some embodiments, access control server 140 may conduct a risk analysis based on the data received from communication device 110 operated by a user/consumer. The data may include communication device data, user identifying data, geolocation data, transaction data, account credentials, and/or other comparable data. Access control server 140 may use this data to determine a risk associated with communication device 110 or risk associated with the account credentials being used for the transaction. In some embodiments, access control server 110 may query third party sources in order to retrieve additional data for performing the risk analysis. In some embodiments, the third party sources may conduct the risk analysis and send the risk analysis to access control server 140 to facilitate the remote authentication process.

Access control server 140 may have pre-defined or user-defined risk thresholds. When the risk level is below the risk threshold, access control server 140 may provide an indication that the user and/or the user's communication device is authenticated and that the transaction may proceed. When the risk level is above the risk threshold, access control server 140 may provide an indication that the user is not authenticated, and that the transaction should not proceed. In some embodiments, access control server 140 may determine that it has insufficient data to make a decision and may indicate that stepped-up authentication processes should be conducted (e.g., challenge question, password, PIN request, etc.). In such embodiments, the stepped-up authentication may be performed by access control server 140, or by another entity, such as the merchant computer 120.

Access control server 140 may generate an authentication response message for merchant computer 120 based on the risk analysis conducted by access control server 140. The authentication response message may provide an indication to the merchant as to whether the user of communication device 110 conducting the transaction has been authenticated, not authenticated, or that authentication processes should be stepped up, for example, if access control server 140 is not sure whether the rightful user is conducting the transaction. In such cases, access control server 140 may suggest that further authentication processes should be performed.

If the authentication response message indicates that the user/consumer has been authenticated by access control server 140, merchant computer 120 may continue the transaction by generating a authorization request message. The authorization request message may include a token along with other transaction and/or user identifying data. Merchant computer 120 may route the authorization request message to an issuer computer 170 for additional transaction processing. For example, merchant computer 140 may send the authorization request message to acquirer computer 150 associated with the merchant, and acquirer computer may then forward the authorization request message to a transaction processing network 160. The transaction processing network 160 may identify the token service provider that issued and/or manages the token used in the transaction, and interact with transaction service computing system 130 (e.g., token service server 134) to de-tokenize the token and verify that the token is being used within its token domain. The transaction service computing system 130 may modify the authorization request message to replace the token with the corresponding account identifier. The modified authorization request message can then be sent to issuer computer 170 for authorization.

Issuer computer 170 may authorize or deny the transaction. In some embodiments, issuer computer 170 may authorize or deny the transaction based on the remote authentication processing performed by access control server 140 and verification of the token domain restrictions performed by token service server 134. Issuer computer 170 may generate a authorization response message indicating whether the transaction is authorized or denied. Issuer computer 170 may send the authorization response message to merchant computer 120 via transaction processing network 160 and acquirer computer 150. The authorization response message may include the account identifier associated with the token used in the transaction, and an indicator indicating whether the transaction has been authorized or denied. In some embodiments, transaction processing network 160 may re-tokenize the account identifier (e.g., send the account identifier to the token service server 134 and receive the token representing the account identifier), and modify the authorization request message to replace the account identifier with the received token before forwarding the authorization response message to merchant computer 120.

Figure 2:
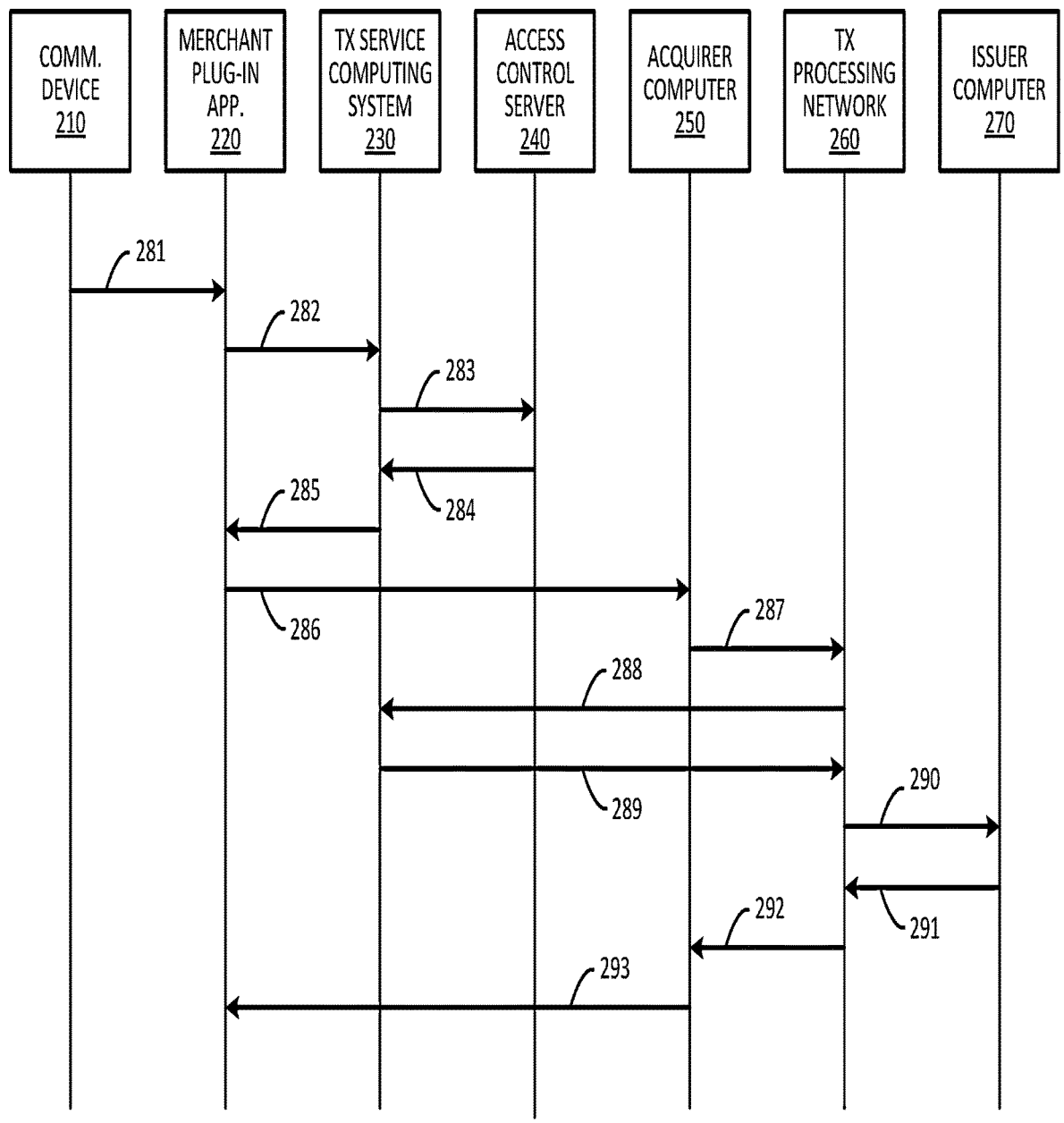
FIG. 2 illustrates a communication flow diagram of an example of a process for combining domain restriction with remote authentication, according to some embodiments.

FIG. 2 illustrates a communication flow diagram for processing an online transaction that combines token domain restriction with remote authentication, according to some embodiments. At step 281, communication device 210 operated by a user/consumer may initiate a transaction by transmitting account credentials and transaction data (e.g., transaction amount, an application transaction counter value, etc.) over a computer network such as the Internet to a merchant computer implementing a merchant plug-in application (MPI) 220. In some embodiments, MPI 220 can be implemented on a computing device separate from the merchant computer, and merchant computer receiving the account credentials and transaction data from communication device 210 may forward the relevant received data to MPI 220. Communication device 210 may initiate the transaction, for example, in response to a user performing a check-out process at an online merchant via an application (e.g., merchant application, web browser, etc.) executing on communication device 210. The account credentials may include a token substituting a real account identifier. In some embodiments, the account credentials may also include a token requestor ID associated with the token, and a token expiry date. The account credentials may also include the name of the user/account holder, and other user identifying information. Communication device data associated with communication device 210 (e.g., device ID, geo-location of device, etc.) may also be provided to MPI 220.

Upon receiving the data originating from communication device 210, MPI 220 may initiate a remote authentication process to authenticate that the user is the rightful owner of the account credentials being used in the transaction. MPI 220 may analyze the received data and determine that a token is being used to conduct the transaction. For example, MPI 220 may determine that the account credentials has an account data field corresponding to a token format. According to some embodiments, the token may have a format that conforms to an industry standard. For example, the token may start, end or contain one or more specific characters. In some embodiments, the token may consist of truncated account number (e.g. first 6 digits and last 4 digits of the account number are retained) with alphabetic and numeric characters replacing middle digits.

Upon determining that a token is being used to conduct the transaction, MPI 220 may determine the token service provider that issued and/or manages the token being used. For example, at step 282, MPI 220 may forward the account credentials to a directory server that is part of the transaction service computing system 230, and the directory server can identify the token service provider based on analyzing the format of the token. The format of the token may include a series of predetermined characters that are assigned to a specific token service provider. The directory server may have access to a mapping table or database storing the correspondence between the token service providers and predetermined format used by the token service providers. Once the token service provider of the token being used in the transaction is identified, the directory server can forward the account credentials to a token service server of the token service provider that is part of the transaction service computing system 230 for de-tokenization processing. In some embodiments, MPI 220 may determine the token service provider on its own, and MPI 220 may forward the account credentials at step 282 to the token service sever without involving a directory server.

When the token service server of the transaction service computing system 230 receives the account credentials including the token from MPI 220 to conduct the transaction associated with the user of communication device 210, the token service server may determine an account identifier (e.g., a PAN) associated with the token. The token service server may interact with a token vault of the transaction service computing system 230 where tokens and corresponding account identifiers are stored. For example, the tokens and corresponding account identifiers may be stored in a mapping table or in a database. The token service server may query the token vault (e.g. mapping table or database) and retrieve the account identifier (e.g., a PAN) corresponding to the token.

Once the account identifier corresponding to the token being used in the transaction is determined, the transaction service computing system 230 may determine that the account identifier qualifies for remote authentication by a remote access control server. For example, the token service server may provide the account identifier to the directory server, and the directory server may determine that the account identifier is enrolled for remote authentication services. The directory server may then identify the proper access control server 240 to perform the remote authentication based on the account identifier. In some embodiments, the token service server may provide the account identifier back to MPI 220, and MPI 220 may provide the account identifier to the directory server to determine if the account identifier qualifies for remote authentication.

At step 283, the transaction service computing system 230 (e.g., directory server or token service server) may generate an authentication request to authenticate the account credentials and user of communication device 210, and send the authentication request to remote access control server 240. The authentication request may include the account identifier correspond to the token and other account credentials such as the name of the user/account holder. The authentication request may also include merchant information associated with the merchant or MPI 220 such as a merchant identifier. In some embodiments, MPI 220 may generate the authentication request and send the authentication request to remote access control server 230.

Remote access control server 230 can then perform a remote authentication using the data in the authentication request to determine whether the user is the rightful owner or assignee of the indicated account identifier. In some embodiments, remote access control server 230 may interact with the user of communication device 210 for stepped-up authentication so that the user may authenticate his or her identity by presenting additional authentication information to remote access control server 230. In some embodiments, the user may authenticate his or her identity by providing a password, PIN, credential, or other identifying information or answer to a challenge question previously associated with their account. For example, remote access control server 230 may generate an authentication message for the user. The authentication message may be sent to communication device 210. The authentication message may cause communication device 210 to display an authentication challenge user interface, and request the user to provide a response to the challenge (e.g., password, etc.). Communication device 210 may send a reply message including the user's response to the authentication challenge (e.g., password, etc.) to remote access control server 230. Access control server 230 may determine whether the provided password is correct to authenticate the user. In some embodiments, if the submitted account credentials are valid and the transaction appears to be legitimate, remote access control server 230 may authenticate the user without stepped-up authentication.

Remote access control server 230 may generate an authentication tracking value that is used by remote access control server 230 to identify and track the transaction. In some embodiments, the authentication tracking value can be a random number or an unpredictable number. Upon authenticating the user and the account credentials, remote access control server 230 may generate an authentication verification value for the transaction. The authentication verification value may include an authentication result code, an access control encryption key indicator, an authentication cryptogram, a portion of the authentication tracking value (e.g., last four digits), and/or the authentication tracking value. The authentication result code is sued to indicate whether the authentication was successful, could not be performed, or failed. The authentication cryptogram is generated based on the authentication tracking value generated by remote access control server 230. For example, the authentication cryptogram can be generated by encrypting an authentication data set including the account identifier associated with the token, the authentication result code, and at least a portion of the authentication transaction value (e.g., last four digits of the authentication transaction value) using an access control encryption key. The access control encryption key indicator identifies the access control encryption key used for generation of the authentication cryptogram.

At step 284, remote access control server 240 may generate an authentication response message including the account identifier and the authentication verification value to the transaction service computing system 230 (e.g., directory server, or token service server). Upon receiving the authentication tracking value (as part of the authentication verification value) that the remote access control server used in generation of an authentication cryptogram, transaction service computing system 230 (e.g., token service server) may generate a domain restriction cryptogram that is used for domain restriction of the token. The domain restriction cryptogram can be generated based on the authentication tracking value. In embodiments in which the authentication verification value is sent by remote access control server 240 to the directory server of the transaction service computing system 230, the directory server may forward the authentication tracking value to the token service server to enable the token service server to generate the domain restriction cryptogram.

According to some embodiments, the domain restriction cryptogram can be generated by encrypting a domain restriction data set using a derived encryption key. The derived encryption key can be derived from a root encryption key and the token being used in the transaction, and the domain restriction data set may include at least a token requestor ID associated with the token (e.g., can be retrieved from the token vault) and at least a portion of the authentication transaction value (e.g., last four digits). In some embodiments, the domain restriction data set may also include an application transaction counter value. The application transaction counter value is incremented for each transaction conducted using the token. Depending on the type of token being used, the application transaction counter can be maintained by the token service server of the transaction service computing system 230 (e.g., if the token is a cloud-based token retrieved from the cloud at time of transaction), or by the transaction application on communication device 210 (e.g., if the token is locally stored and maintained on communication device 210). Thus, in some embodiments, the application transaction counter value can be incremented by the transaction service computing system 230 (e.g., token service server) and be provided to communication device 210, or the application transaction counter value can be incremented by communication device 210 and be provided to transaction service computing system 230 (e.g., token service server). In some embodiments, the domain restriction data set may also include an electronic commerce indicator and an indication of whether any local consumer verification method was used during the transaction (e.g., entry of PIN onto communication device 210).

In some embodiments, the token service server may store a timestamp indicating when the domain restriction cryptogram was generated. If authorization of a transaction using the domain restriction cryptogram is not completed within a predetermined amount of time (e.g., 5 minutes, 10 minutes, 30 minutes, 1 hour, etc.), the domain restriction cryptogram may expire, and a transaction conducted using the domain restriction cryptogram thereafter will be declined. Thus, a timestamp can be used to limit the amount of time that the domain restriction cryptogram remains valid.

At step 285, the transaction service computing system 230 (e.g., directory server, or token service server) may gather the various data elements to form an in-app authentication data set, and send the in-app authentication data set to MPI 220. The in-app authentication data set can be collected by the directory server or by the token service sever, and may include a domain restriction key index identifying the root encryption key from which the derived encryption key used in generating the domain restriction cryptogram was derived, the domain restriction cryptogram generated by the token service server, the application transaction counter value, the authentication tracking value generated by remote access control server 240, the authentication result code provided by remote access control server 240, the access control encryption key indicator, the authentication verification value generated by remote access control server 240, and/or an indication of whether any local consumer verification method was used during the transaction.

At step 286, MPI 220 may generate an authorization request message including the token, the token requestor ID, and data elements from the in-app authentication data set to request authorization for the transaction, and send the authorization request message to acquire computer 250. For example, the data elements from the in-app authentication data set that are included in the authorization request message may include at least the authentication cryptogram, the domain restriction cryptogram, and the authentication tracking value used in generation of the authentication cryptogram and the domain restriction cryptogram. The transaction can be authorized by verifying both the authentication cryptogram and the domain restriction cryptogram.

At step 287, acquirer computer 250 may forward the authorization request message to transaction processing network 260. Transaction processing network 260 may determine that a token is being used to conduct the transaction, and forward the authorization request message to transaction service computing system 230 (e.g., token service server) at step 288 for de-tokenization and to apply domain restriction controls on the token being used in the transaction. Upon receiving the authorization request message, transaction service computing system 230 (e.g., token service server) may re-generate the domain restriction cryptogram using the token requestor ID and the authentication tracking value received in the authorization request message, and compare the re-generated domain restriction cryptogram with the previously generated domain restriction cryptogram provided in the authorization request message. If the domain restriction cryptograms match, and the domain restriction cryptogram is being used within its time limit, then the token is verified as being used within its token domain. The transaction service computing system 230 (e.g., token service server) may then de-tokenize the token to retrieve the account identifier associated with the token, and modify the authorization request message by replacing the token with the retrieve account identifier. If the domain restriction cryptograms do not match, them the token is likely being used outside of its token domain, and the transaction can be denied.

At step 289, the transaction service computing system 230 (e.g., token service server) may send the modified authorization request message to transaction processing network 260. Transaction processing network 260 then forwards the modified authorization request message to issuer computer 270 at step 290 for authorization. Upon receiving the modified authorization request message, issuer computer 270 may re-generate the authentication cryptogram using the account identifier and the authentication tracking value, and compare the re-generated authentication cryptogram with the authentication cryptogram provided in the authorization request message. If the authentication cryptograms match, then the user and account credentials has previously been authenticated by remote access control server 240, and the transaction can be authorized by issuer computer 270. If the authentication cryptograms do not match, the transaction can be denied.

At step 291, issuer computer 270 may generate an authorization response message and send it to transaction processing network 260. The transaction authorization response message may include at least the account identifier and an indication of whether the transaction has been authorized. At step 292, transaction processing network 260 may forward the authorization response message to acquirer computer 250. Either transaction processing network 260 or acquirer computer 250 may interact with the transaction service computing system 230 (e.g., token service server) to re-tokenize the authorization response message (e.g., to replace teh account identifier with the token). Acquirer 250 may then send the modified authorization response message to MPI 220 at step 293 to inform the merchant whether the transaction has been authorized or denied by issuer computer 270.

Although the above processing has been described with reference to certain components (e.g., MPI 220, directory server of transaction service computing system 230, token service server of transaction service computing system 230, transaction processing network 260, issuer computer 270, etc.) performing certain functions, it should be understood that in some embodiments, the functionalities performed by one component can be performed by another component. Furthermore, in some embodiments, components that have been described as separate components can be combined into one. For example, in some embodiments, the functionalities performed by the directory server and token service server can be performed by a single server implementing both functionalities.

Figure 3:
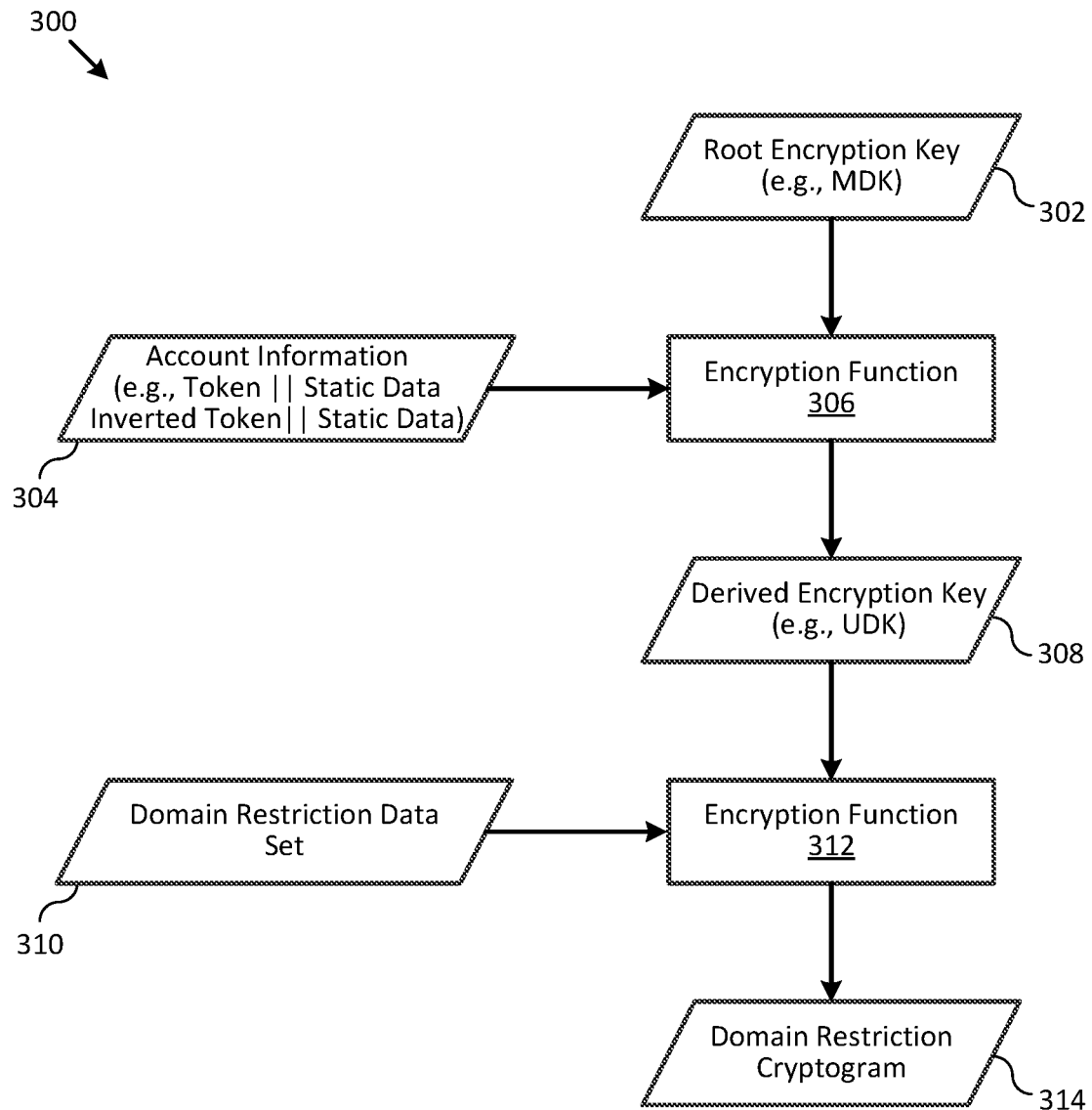
FIG. 3 illustrates a flow diagram of an example of a process for generating a domain restriction cryptogram, according to some embodiments.

FIG. 3 illustrates a block diagram of an example of a process 300 for generating a domain restriction cryptogram, according to some embodiments. Any one of the encryption functions 306 and/or 312 can be the same or be different than any of the other encryption functions. For example, any one of the encryption functions 306 and/or 312 may be implemented as triple data encryption standard (TDES), data encryption standard (DES), advanced encryption standard (AES), or other suitable encryption algorithms.

Process 300 may begin by encrypting account information 304 with a root encryption key 302 using an encryption function 306 to generate a derived encryption key 308. The root encryption key 302 may be a base key that is associated with the issuer of the token, and the base key may be associated with a group of tokens. For example, the root encryption key 302 may be associated with a group of tokens designated for a certain token domain. In some embodiments, the root encryption key 302 may be a master derivation key (MDK) associated with the issuer of token, and the root encryption key 302 can be maintained by a token service provider.

The account information 304 may include account identifying information such as a token that is a substitute for an account identifier, and may additionally include static data such as a predetermined string (e.g., '00'). For example, the account information 304 that is used as the input to encryption function 306 can be a concatenation of the token and the static data, or an inverted version of the concatenation.

In some embodiments, the derived encryption key 308 generated from the account information 304 may include multiple portions that are each generated from different variations of the account information 304. For example, the derived encryption key 308 may be divided into two portions. The first portion of the derived encryption key 308 may be generated by encrypting the account information 304 using the root encryption key 302. The second portion of the derived encryption key 308 may be generated by inverting the account information 304 and encrypting the inverted account information using the root encryption key 302. The encryption function 306 used to generate the derived encryption key 308 may be, for example, triple data encryption standard (TDES) or other suitable encryption algorithms, and may use an initial chaining vector of binary zeros. In some embodiments, the derived encryption key 308 generated from the account information 304 may correspond to a unique derivation key (UDK) for the account.

Process 300 may continue by encrypting a domain restriction data set 310 with the derived encryption key 308 using an encryption function 312 to generate the domain restriction cryptogram 314. The domain restriction data set 310 may include an application transaction counter, a token requestor ID, an electronic commerce indicator, a local consumer verification method indicator, an authentication tracking value, and any necessary padding data. The encryption function 312 used to generate the domain restriction cryptogram 314 may be, for example, triple data encryption standard (TDES) or other suitable encryption algorithms.

Figure 4:
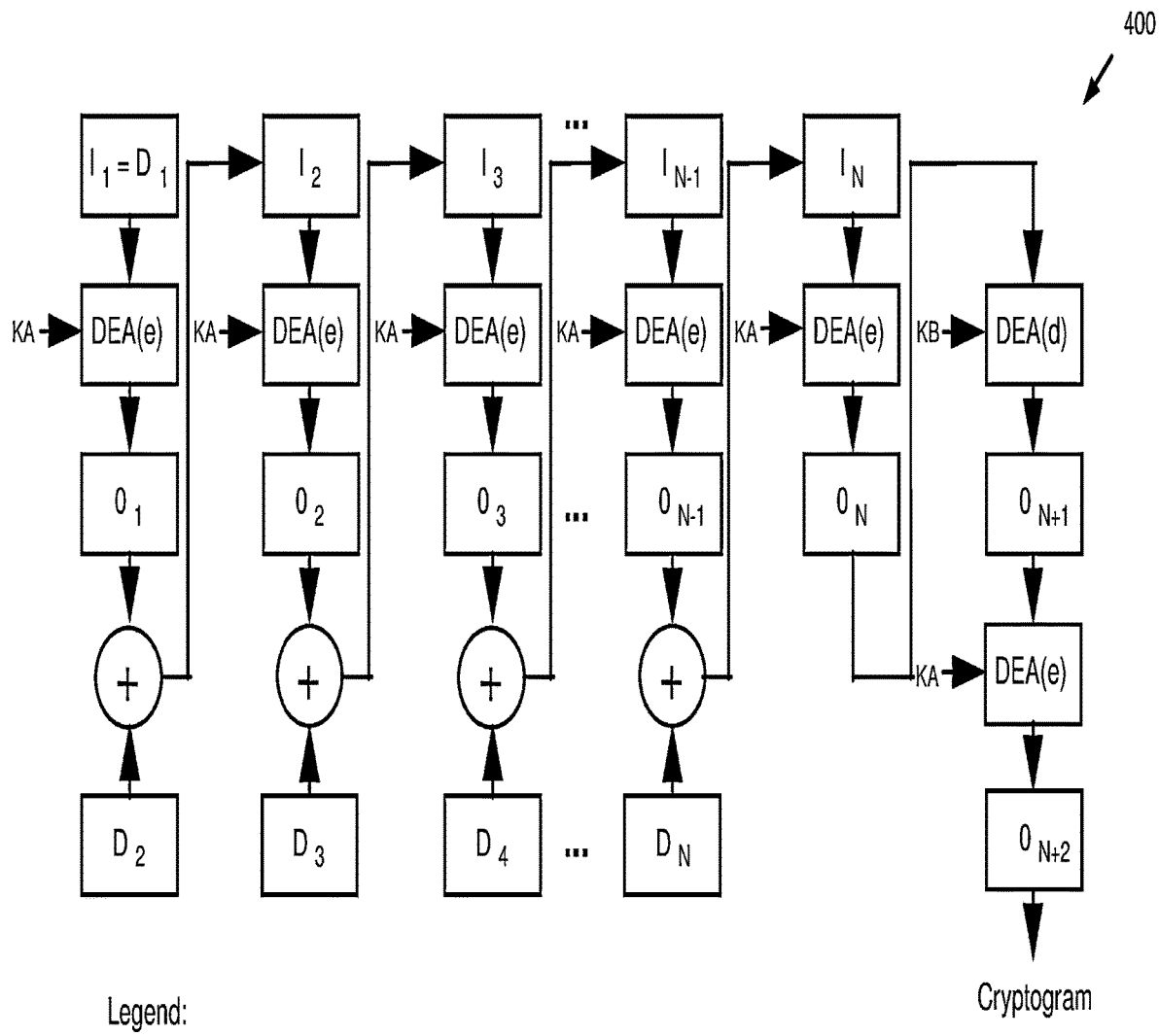
FIG. 4 illustrates a flow diagram of an example of an encryption function, according to some embodiments.

FIG. 4 illustrates a block diagram of an example of encryption function 400, according to some embodiments. In some embodiments, encryption function 400 can be used as encryption function 312. For example, the data elements that make up the domain restriction data set 310 may be concatenated together (e.g., in the order described above), and then divided into a set of data blocks $D_1$ to $D_N$ of equal length (e.g., 8-byte data blocks). If the domain restriction data set 310 does not divide equally into the length of the data blocks, the missing least significant bits in the last data block $D_N$ can be zero filled. The first key KA may correspond to a first portion of the derived encryption key 308 (e.g., most significant 8 bytes), and the second key KB may correspond to a second portion of the derived encryption key 308 (e.g., least significant 8 bytes) An iterative enciphering process may be applied to the set of data blocks $D_1$ to $D_N$. The iterative enciphering process may include encrypting a first data block $D_1$ using key KA as the encryption key in a data encryption algorithm (DEA(e)). The result of the encryption is then exclusive-ORed with the next data block $D_2$. The result of the exclusive-OR operation is then used as the input for the next iteration of the enciphering process. The enciphering process continues until all data blocks $D_1$ to $D_N$ has been processed, and the output $I_N$ of the last exclusive-OR operation with the last data block $D_N$ is encrypted to form the output of the iterative enciphering process $O_N$. The output of the of the iterative enciphering process $O_N$ may then be deciphered using key KB as the decryption key in data decryption algorithm (DEA(d)). The output of the deciphering process $O_{N+1}$ is then re-enciphered using key KA as the encryption key in a data encryption algorithm (DEA(e)) to generate the output $O_{N+2}$. According to some embodiments, the output $O_{N+2}$ can be used as the domain restriction cryptogram 314.

It should be noted that in some embodiments, the encryption function 400 described with reference to FIG. 4 can be used to generate the authentication cryptogram as well, for example, by applying the encryption function 400 over the authentication data set. In some embodiments, the encryption function 400 described with reference to FIG. 4 can also be used for encryption functions 306.

Figure 5:
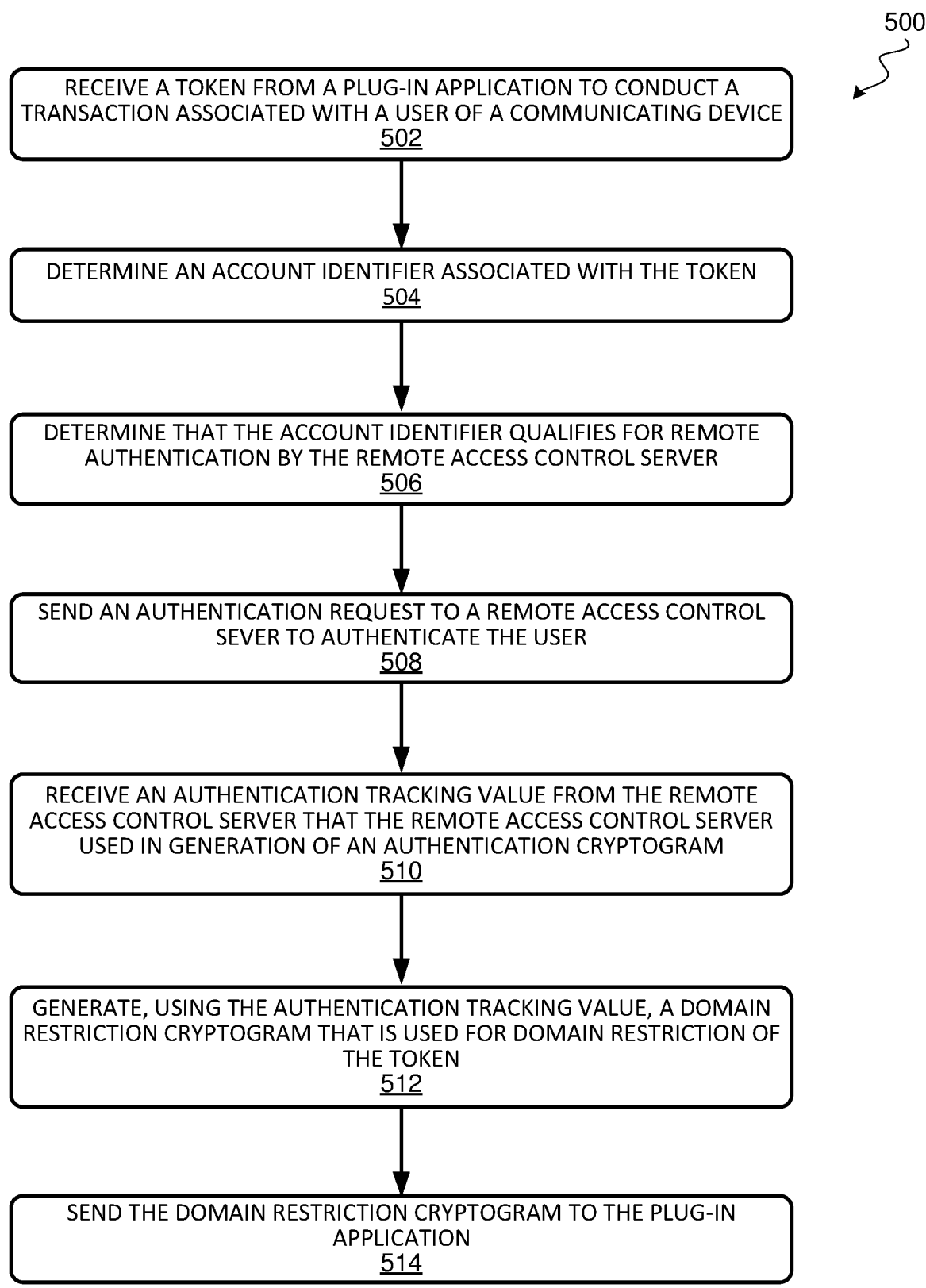
FIG. 5 illustrates a flow chart of an example of a process for combining domain restriction with remote authentication, according to some embodiments.

FIG. 5 illustrates a flow chart of a process 500 for processing an online transaction that combines token domain restriction with remote authentication, according to some embodiments. Process 500 can be performed by a computer system (e.g., a transaction computer system). In some embodiments, the computer system can be operated by a token service provider.

At block 502, a token from a plug-in application (e.g., a merchant plug-in application) is received to conduct a transaction associated with a user of a communicating device. At block 504, an account identifier associated with the token is determined (e.g., by querying a token vault). At block 506, a determination is made that the account identifier qualifies for remote authentication by the remote access control server (e.g., if the account identifier has been previously enrolled or registered for remote authentication).

At block 508, an authentication request is sent to a remote access control server to authenticate the user. At block 510, an authentication tracking value is received from the remote access control server that the remote access control server used in generation of an authentication cryptogram. At block 512, a domain restriction cryptogram that is used for domain restriction of the token is generated using the authentication tracking value. The authentication tracking value provides a mechanism to link the remote authentication process to the token domain restriction for the transaction. At block 514, the domain restriction cryptogram is sent to the plug-in application. Thereafter, an authorization request message including both the authentication cryptogram and the domain restriction cryptogram generated based on the authentication tracking value can be generated, and the transaction can be authorized by verifying both the authentication cryptogram and the domain restriction cryptogram to combine token domain restriction with remote authentication for the transaction.

Figure 6:
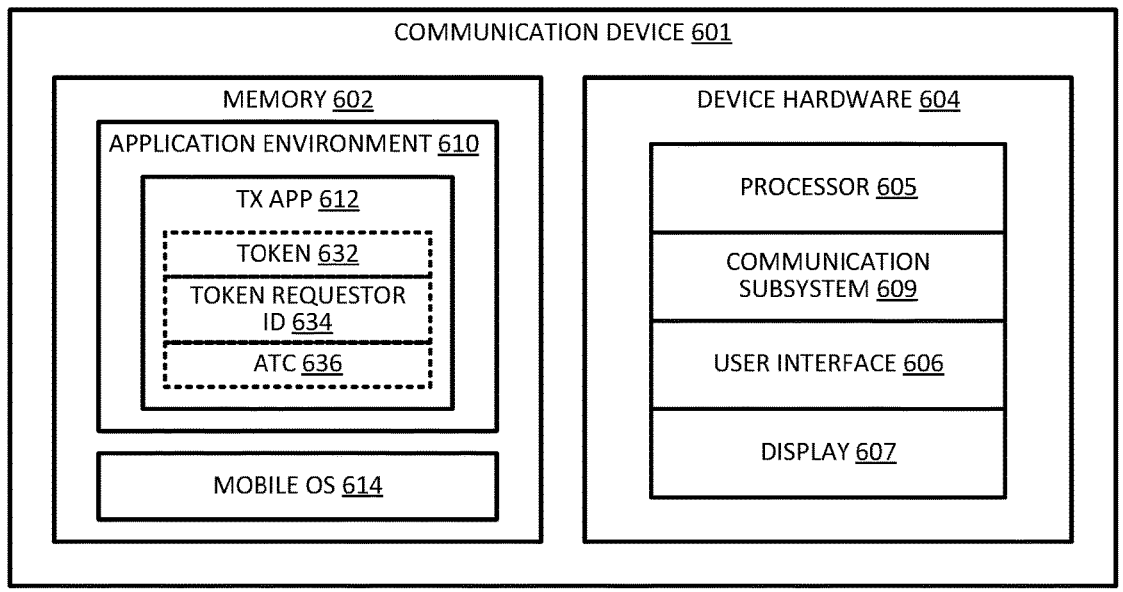
FIG. 6 illustrates a block diagram of an example of a communication device, according to some embodiments.

FIG. 6 illustrates a block diagram of a communication device 601 that can be used to conduct a transaction over a computer network such as the Internet, according to some embodiments. Communication device 601 may include device hardware 604 coupled to a memory 602. Device hardware 604 may include a processor 605, a communications subsystem 609, use interface 606, a display screen 607 (which may be part of user interface 606). Processor 605 can be implemented as one or more integrated circuits (e.g., one or more single core or multicore microprocessors and/or microcontrollers), and is used to control the operation of portable communication device 601. Processor 605 can execute a variety of programs in response to program code or computer-readable code stored in memory 602, and can maintain multiple concurrently executing programs or processes. Communications subsystem 606 may include one or more RF transceivers and/or connectors that can be used by communication device 601 to communicate with other devices and/or to connect with external networks such as the Internet. User interface 606 can include any combination of input and output elements to allow a user to interact with and invoke the functionalities of communication device 601. In some embodiments, display screen 607 may be part of user interface 606.

Memory 602 can be implemented using any combination of any number of non-volatile memories (e.g., flash memory) and volatile memories (e.g., DRAM, SRAM), or any other non-transitory storage medium, or a combination thereof media. Memory 602 may store an operating system 614 and an application environment 610 where one or more applications reside including transaction application 612 (e.g., merchant application, web browser, etc.) to be executed by processor 605. In some embodiments, transaction application 612 can be used to initiate a transaction conducted over a computer network. Transaction application 613 may store a token that is used as a subtitle for a real account identifier to conduct a transaction, and a token requestor ID 634 that was assigned to the token 632 when the token was provisioned to transaction application 613. In some embodiments, transaction application 613 may also store an application transaction counter 636 that is incremented for each transaction conducted using the token. In some embodiments, the token 632, the token requestor ID 634, and the application transaction counter 636 can be stored and maintained remotely in the cloud, and be retrieved from the cloud by transaction application 612 at the time of a transaction.

The various entities or components described herein with reference to FIG. 1 may be associated with or operate one or more computer apparatuses to facilitate the functions described herein. Any of the entities or components in FIG. 1, including any computer, computing system, server, or database, may use any suitable number of subsystems to facilitate the functions.

Figure 7:
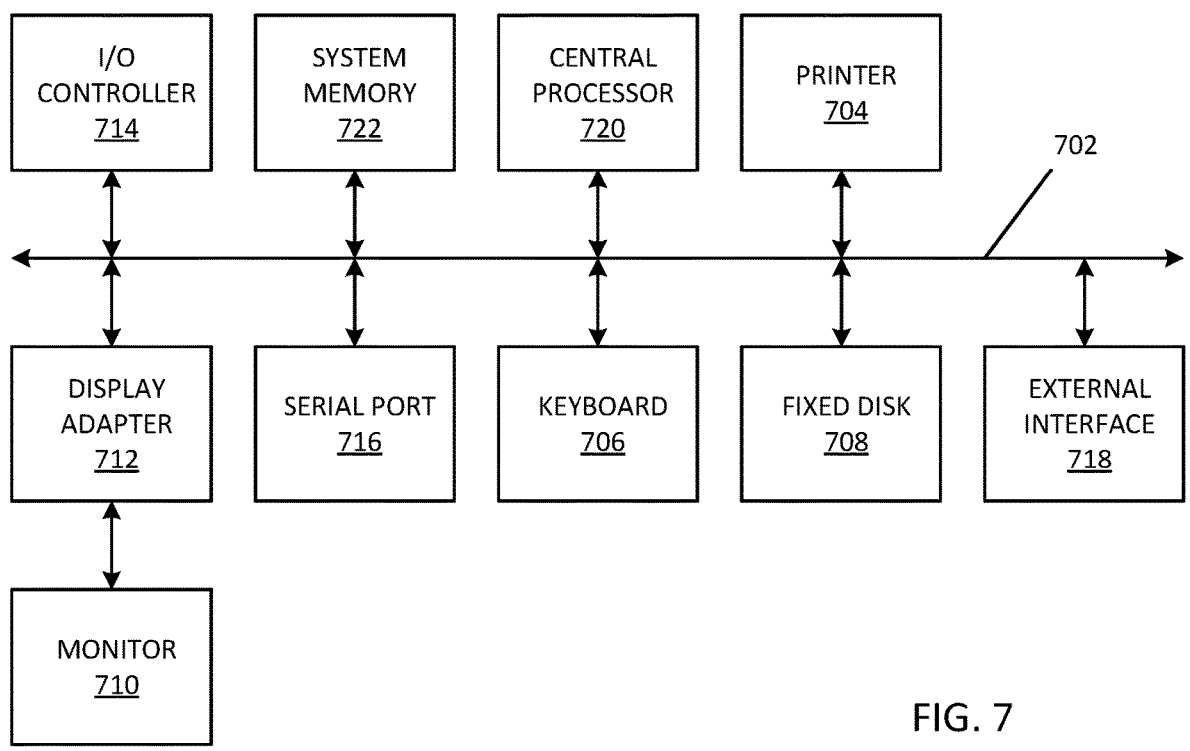
FIG. 7 illustrates a block diagram of an example of a computing device, according to some embodiments.

Examples of such subsystems or components are shown in FIG. 7. The subsystems shown in FIG. 7 are interconnected via a system bus 702. Additional subsystems such as a printer 704, keyboard 706, fixed disk 708 (or other memory comprising computer readable media), monitor 710, which is coupled to display adapter 712, and others are shown. Peripherals and input/output (I/O) devices, which couple to I/O controller 714 (which can be a processor or other suitable controller), can be connected to the computer system by any number of means known in the art, such as serial port 716. For example, serial port 1616 or external interface 718 can be used to connect the computer apparatus to a wide area network such as the Internet, a mouse input device, or a scanner. The interconnection via system bus allows the central processor 720 to communicate with each subsystem and to control the execution of instructions from system memory 722 or the fixed disk 708, as well as the exchange of information between subsystems. The system memory 722 and/or the fixed disk 1608 may embody a computer readable medium.

The above description is illustrative and is not restrictive. Many variations of the various embodiments may become apparent to those skilled in the art upon review of the disclosure. The scope of the invention may, therefore, be determined not with reference to the above description, but instead may be determined with reference to the pending claims along with their full scope or equivalents.

The methods and processes described herein are exemplary in nature, and the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof.

It may be understood that some embodiments as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A computer system comprising:
at least one processor and at least one memory coupled to the at least one processor, the at least one memory storing instructions, which when executed by the at least one processor cause the at least one processor to:
receive a token representing an account identifier from a communication device of a user;
transmit the token to a transaction service computing system, which transmits an authentication request to an access control server which authenticates the user, generates an authentication tracking value, generates an authentication cryptogram using at least a portion of the authentication tracking value, and transmits an authentication response comprising the authentication tracking value to the transaction service computing system;
receive from the transaction service computing system, an authentication data set comprising the authentication tracking value and a domain restriction cryptogram that is linked to the authentication cryptogram, the domain restriction cryptogram formed by encrypting a domain restriction data set that includes a token requestor identifier and at least the portion of the authentication tracking value, wherein the token is restricted for use within a domain associated with the token requestor identifier;
generate an authorization request message for a transaction, the authorization request message comprising the token, the token requestor identifier, the authentication cryptogram, and the domain restriction cryptogram; and
transmit the authorization request message including the token, the token requestor identifier, the authentication cryptogram, and the domain restriction cryptogram to a transaction processing network for approval, wherein the approval is based upon validation of the domain restriction cryptogram and validation of the authentication cryptogram.

2. The computing system of claim 1, wherein the transaction processing network modifies the authorization request message to form a modified authorization request message and forwards the modified authorization request message to an issuer computer.

3. The computing system of claim 2, wherein the issuer computer validates the authentication cryptogram and the transaction processing network validates the domain restriction cryptogram.

4. The computing system of claim 1, wherein the domain restriction data set further includes an application transaction counter value.

5. The computing system of claim 4, wherein the application transaction counter value is incremented for each transaction conducted using the token.

6. The computing system of claim 1, wherein the transaction processing network modifies the authorization request message to form a modified authorization request message and forwards the modified authorization request message to an issuer computer, and wherein the modified authorization request message comprises the account identifier and the authentication cryptogram.

7. The computing system of claim 1, wherein the authentication cryptogram is generated by encrypting an authentication data set including the account identifier associated with the token and at least the portion of the authentication tracking value using an access control encryption key.

8. The computing system of claim 1, wherein the authentication tracking value is generated by the access control server.

9. The computing system of claim 1, wherein the domain restriction cryptogram is validated by regenerating the domain restriction cryptogram using at least the portion of the authentication tracking value and comparing the regenerated authentication tracking value with the received authentication tracking value.

10. The computing system of claim 1, wherein the at least the portion of the authentication tracking value is the entire authentication tracking value.

11. The computing system of claim 1, wherein the domain restriction cryptogram is generated by encrypting the domain restriction data set using a derived encryption key.

12. A method comprising:
- receiving, by a computer, a token representing an account identifier from a communication device of a user;
- transmitting, by the computer, the token to a transaction service computing system, which transmits an authentication request to an access control server which authenticates the user, generates an authentication tracking value, generates an authentication cryptogram using the authentication tracking value, and transmits an authentication response comprising the authentication tracking value to the transaction service computing system;
- receiving, by the computer from the transaction service comprising system, an authentication data set comprising at least a portion of the authentication tracking value and a domain restriction cryptogram that is linked to the authentication cryptogram, the domain restriction cryptogram formed by encrypting a domain restriction data set that includes a token requestor identifier and at least the portion of the authentication tracking value, wherein the token is restricted for use within a domain associated with the token requestor identifier;
- generating, by the computer, an authorization request message for a transaction, the authorization request message comprising the token, the token requestor identifier, the authentication cryptogram, and the domain restriction cryptogram; and
- transmitting, by the computer, the authorization request message including the token, the token requestor identifier, the authentication cryptogram, and the domain restriction cryptogram to a transaction processing network for approval, wherein the approval is based upon validation of the domain restriction cryptogram and validation of the authentication cryptogram.

13. The method of claim 12, wherein the domain restriction data set further includes an application transaction counter.

14. The method of claim 13, wherein the application transaction counter is incremented for each transaction conducted using the token.

15. The method of claim 13, wherein the application transaction counter is incremented by the transaction service computing system or by the communication device.

16. The method of claim 12, wherein the transaction service computing system comprises a directory server determines the account identifier from the token and determines the access control server from the account identifier.

17. The method of claim 12, wherein the transaction processing network modifies the authorization request message to form a modified authorization request message and forwards the modified authorization request message to an issuer computer, the issuer computer approving of the transaction.

18. The method of claim 12, wherein the computer is a merchant computer comprising a merchant plug-in application.

19. The method of claim 12, wherein the authorization request message comprises a transaction amount.

20. The method of claim 12, wherein the transaction is a purchase transaction.

* * * * *